April 14, 1953     W. E. WHITNEY     2,634,948
SAFETY VALVE
Filed May 28, 1947     2 SHEETS—SHEET 1
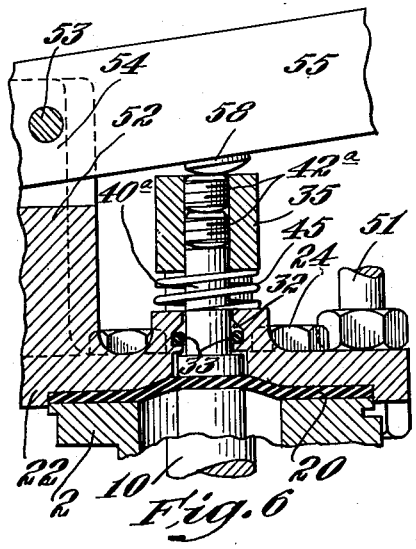
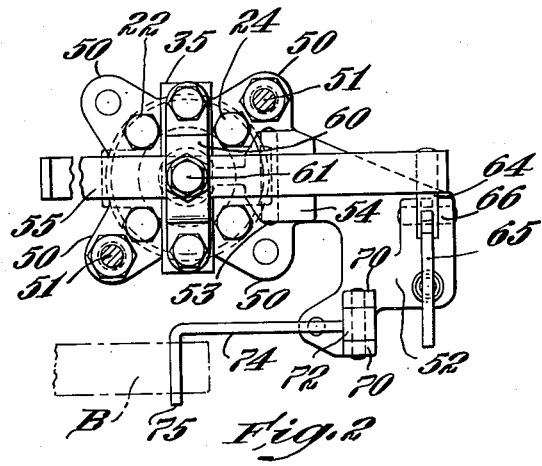
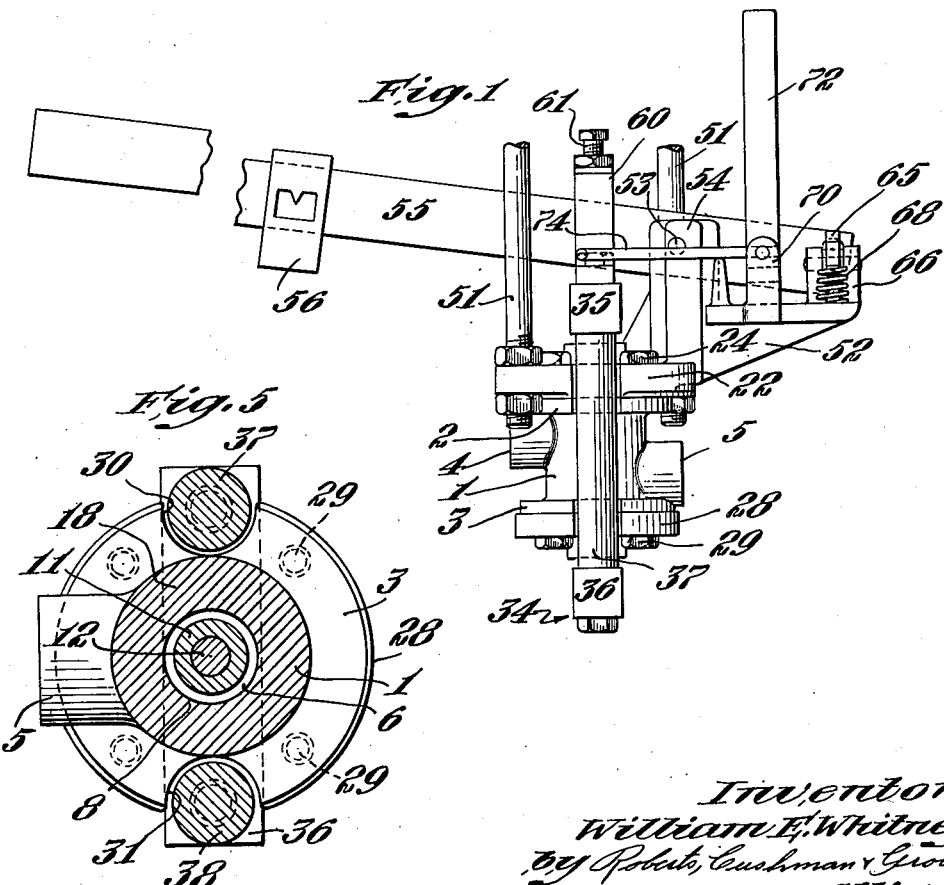
Inventor
William E. Whitney
by Roberts, Cushman & Grover
att'ys.

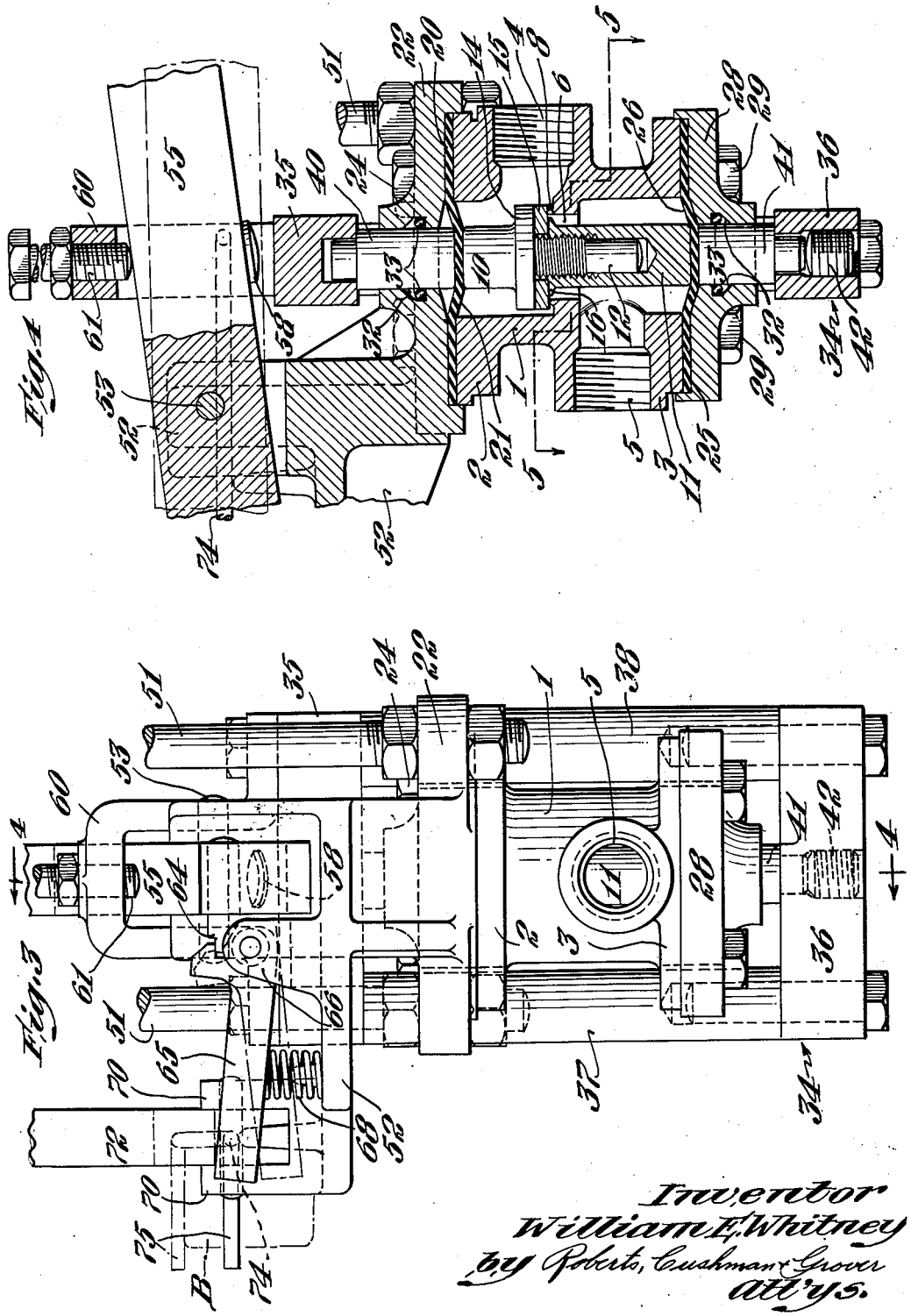

Patented Apr. 14, 1953

2,634,948

UNITED STATES PATENT OFFICE 2,634,948

SAFETY VALVE

William E. Whitney, Belmont, Mass., assignor, by mesne assignments, to Stator Company, a corporation of Massachusetts Application May 28, 1947, Serial No. 751,062

5 Claims. (Cl. 251—133)

This invention relates to valves of the type used in controlling the flow of fluids under relatively high pressure and as illustrative of its utility the invention is herein shown as applied to apparatus for use in filling tanks with propane or the like volatile liquid which is maintained under relatively high pressure.

The principal object of the invention is to provide an efficient and reliable valve which is not only leakproof, but also easy to operate even when relatively high pressures are involved, thereby permitting the use of light-weight trips, small solenoids and the like operating means.

Further objects relate to various features of construction and will be apparent from a consideration of the following description and the accompanying drawings wherein:

Fig. 1 is a side elevation of a valve constructed in accordance with the present invention and associated operating mechanism;

Fig. 2 is a top plan view of the valve and associated mechanism shown in Fig. 1;

Fig. 3 is an enlarged side elevation as viewed from the line 3—3 of Fig. 1;

Fig. 4 is a section on the line 4—4 of Fig. 3;

Fig. 5 is a section on line 5—5 of Fig. 4; and

Fig. 6 is an enlarged fragmentary vertical section through the upper part of a valve of modified construction.

In accordance with the present invention my valve structure comprises a casing having inlet and outlet ports and a valve opening between the ports defining two or more compartments communicating with the inlet and outlet ports. A movable valve stem is mounted within the casing and extends through the valve opening with its opposite ends adjacent to the ends of the casing, and a valve head or other suitable closure member is carried by the stem so as to open and close the valve opening when the stem is moved from one position to another. At or adjacent to the opposite ends of the casing are flexible imperforate diaphragms which may consist of a combination of one or more layers of plastic sheet with one or more layers of a woven fabric, and/or any other suitable material chemically resistant to the fluids with which the valve is to be used and having a high flexing strength so as to withstand continuous use over long periods of time. The diaphragms are secured to the casing so as to provide leakproof closures at or adjacent to its ends and the construction and arrangement of parts are such that the opposite ends of the stem are engageable with the diaphragms so that inward and outward flexing movement of the diaphragms actuates the stem and valve head.

The effective area in one or both of the diaphragms may be greater or smaller than that of the valve head so that, if desired, a difference in pressure in the compartments is operative to open or close the valve, although it is to be understood that, if desired, a spring weight or the like means may be used, alone or in conjunction with diaphragms and a valve head having the same or different effective areas, so as normally to maintain the valve in either open or closed position.

The actuating means for the valve comprises a yoke or the like member embracing or slidably mounted on the exterior of the valve casing, the operating member having parts engageable with the outer faces of the diaphragms so as to flex them inwardly to operate the valve when the operating member is slid or moved from one position to another. If desired, the operating member may be associated with a lever or other suitable actuating means which may be operated mechanically, electrically, pneumatically or hydraulically in accordance with the requirements of the contemplated use.

Referring to the accompanying drawings which show what is now considered a preferred embodiment of the invention, the numeral 1 designates a generally cylindrical valve casing having flanged opposite ends 2 and 3 and inlet and outlet ports 4 and 5 between which is a valve opening 6 and seat 8 (Fig. 4) dividing the interior of the valve casing into an upper compartment communicating with the inlet 4 and a lower compartment communicating with the outlet 5.

A valve stem is axially mounted within the casing 1 and, as shown in Figs. 4 and 5, the stem comprises an upper section 10 and a lower section 11 interconnected by a threaded stud 12 integral with the inner end of the section 10. The lower end of the upper section 10 is enlarged so as to provide an annular shoulder 14 against which a washer or the like annular member 15 is seated, being retained in position by a flange 16 integral with the inner end of the lower section 11. The upper part of the lower section 11 is formed with radial guide lugs 18 (Fig. 5) engageable with the wall of the valve opening 6 so as to center the valve stem and guide it as it is moved from one position to another. The overall length of the valve stem may be approximately the same as the length of the casing so that when the valve head closes the opening 6, the lower end of the stem projects beyond the outer face of the flange 3 and the upper end of the stem is disposed inwardly of the outer face of the flange 2 and when the valve is open the relative position of these parts is reversed.

The flexible diaphragm 20 is formed with a dished central portion 21 and is secured to the outer face of the flange 2 by a closure plate or the like member 22 which is rigidly held in position by screws 24. In like manner a flexible diaphragm 25, having a dished central portion 26, is secured to the outer face of the flange 3 by a closure plate 28 which is rigidly held in position by screws 29. Both the closure plates 22 and 28 are formed with central openings aligned with the valve stem, and at diametrically opposite points the closure plates and associated flanges 2 and 3 are formed with semi-circular slots or recesses 30 and 31.

Both the closure plates have annular recesses 32 (Fig. 4) surrounding the central openings, each of which recesses may be of trapezoidal or triangular cross section to provide an upwardly and inwardly inclined or tapered wall, and within each recess and surrounding the associated operating pin is a round annulus or toroid 33 of rubber or rubber-like substance. The action of this annulus permits air to flow back and forth into the chambers above and below the diaphragms when the diaphragms are intact, but if a diaphragm should rupture the outwardly rushing liquid or gas from the valve chamber will force the annulus 33 into the tapered part of the recess and seal the operating pins to the closure plates 22 and 28, thus preventing escape of the liquid or gas.

A rectangular operating yoke 34 embraces the casing 1 and is slidably mounted on its exterior, the yoke comprising top and bottom cross bars 35, 36 rigidly connected with longitudinal rods 37, 38 which are slidably received in the semi-circular slots 30, 31. The upper cross bar 35 is formed with a central opening which receives the reduced outer end of an inwardly extending operating pin or finger 40 (Fig. 4) which projects through the opening in the plate 22 so as to engage the outer face of the diaphragm 20. In similar manner the bottom cross bar 36 is formed with a central opening for receiving the reduced end of finger 41 which is engageable with the outer face of the diaphragm 25. A set screw 42 is threaded through the central opening of the cross bar 36 and engages the outer end of the finger 41 so as to effect relative adjustment between the parts. When the set screw 42 is properly adjusted, the operating finger 40 engages the outer face of the diaphragm 20 and the inner end of the finger 41 engages the outer face of the diaphragm 25, as shown in Fig. 4. Hence movement of the operating yoke, relative to the casing 1, causes the operating fingers 40, 41 to act through the diaphragms 20, 25 on the valve stem so as to open and close the valve head 14, 15. As here shown, the effective areas of both diaphragms 20 and 25 are the same and each is greater than the effective area of the valve head. Hence, when the pressure in the inlet chamber or compartment is greater than that in the outlet chamber, the valve automatically opens unless the movement of the yoke is restrained. If the pressure in both the inlet and outlet compartment is substantially the same, the weight of the yoke tends to close the valve although, if desired, means may be provided as hereinafter shown for opposing closing movement of the valve.

It is apparent from the foregoing that the effective areas may be alike or varied, and may be smaller, the same as, or larger than the effective area of the valve head. Thus, if it is desired to have the valve normally closed the effective area of the inlet diaphragm is smaller than the effective area of the valve and the effective area of the valve is smaller than the effective area of the outlet diaphragm. If it is desired to have the valve normally open the effective areas are reversed.

In the embodiment shown in Fig. 6 a compression spring 45 is circumposed about the depending finger 40$^a$ so as to act on the upper cross bar 35 and the closure plate 22, thereby yieldingly holding the yoke 34 in elevated position and the valve normally open. With this construction and arrangement the effective areas of the diaphragms may be the same as or different from the area of the valve head and in any case the spring 45 is sufficiently strong to maintain the valve open, regardless of the relative size of the diaphragms and valve head. In this embodiment the top cross bar 35 is also provided with a pair of set screws 42$^a$ which may be used in place of or in conjunction with the set screw 42 carried by the lower cross bar 36 to adjust the parts, but in all other material particulars the construction is substantially identical to that previously described.

Although, as above noted, any suitable means may be provided to actuate the yoke 34, the mechanism herein shown is designed for operation by the beam of a weighing scale. Accordingly, the closure plate 22 is formed with radially extending lugs 50, two of which are connected with the lower end of supporting rods 51 by means of which the valve may be supported in fixed position. Between two of the lugs the plate 22 is formed with a laterally extending bracket 52 having upstanding lugs 54 carrying a pin 53 which pivotally supports an operating lever 55 carrying a weight 56 (Fig. 1) longitudinally movable thereon. The underside of the lever 55 is provided with a knob 58 and engageable with the top cross bar 35 (Fig. 4), and a yoke 60 mounted on the cross bar 35 straddles the lever 55 so as to limit its movement relative to the operating yoke 34. A set screw 61, carried by the yoke 60 and engageable with the upper edge of lever 55, limits the free swinging movement of the lever.

The inner end of the lever 55 carries a laterally extending pin 64 (Figs. 2 and 3) engageable with a releasable latch 65 pivotally mounted between upstanding lugs 66 carried by the bracket 52. A compression spring 68 (Fig. 3) acts on the tail of the latch so as normally to hold it in operative or locking position. When the lever 55 is swung upwardly to an inclined position (as shown in Fig. 1 and the full lines of Fig. 4) the nose of the latch 65 engages the outer end of the pins 64, as illustrated in Fig. 3, thereby holding the lever in an upwardly inclined position; but when the tail of the latch is depressed, its nose clears the pin 64, thereby permitting gravity to swing the lever downwardly to horizontal position (shown by the dot and dash lines of Fig. 4) and thus move the operating yoke 34 to its lowermost position to close the valve if in open position.

Pivotally mounted between upstanding lugs 70 on the bracket 52 is an arm 72 (Figs. 1–3) engageable with the tail of the latch. The pivoted end of the arm 72 carries a finger 74 projecting therefrom at right angles so that when the arm 72 is swung to a vertical position at or slightly beyond dead center (Fig. 1) the finger 74 and its bent end 75 (Fig. 2) are held in approximately horizontal position in the path of upward swinging movement of the beam B (Fig. 2) of a weighing scale (not shown). When the finger 74 is swung upwardly by the beam B from its normal operative position (shown by the full lines of Fig. 3) to an inclined position (shown by the dot and dash lines of Fig. 3), the arm 72 is swung clockwise, as viewed in Fig. 1, beyond dead center so that gravity becomes effective to swing the arms 72 downwardly against the tail of the latch 65, thereby releasing the lever 55 which permits it to swing from the inclined position shown by the full lines of Fig. 4 to the horizontal position shown by the dot and dash lines of Fig. 4 wherein it holds the valve closed.

It will be observed that when the lever 55 is swung to an inclined position, the valve may be normally closed, as shown in Fig. 4, in which case the pressure of the fluid admitted to the inlet chamber effects opening of the valve since the effective area of the diaphragm 20 is greater than that of the valve head; or the valve may be normally open, as in the embodiment illustrated in Fig. 6. In either case, tripping of the latch 65 releases the lever 55, causing it to swing downwardly to horizontal position to close the valve against the pressure of the fluid in the inlet chamber, and hence when the lever 55 is in horizontal position, the valve is always held closed. Although in the embodiment of Fig. 4 the pressure of the fluid in the inlet chamber tends to open the valve, the weight 56 carried by the lever 55 is adjusted so as to overcome this tendency with an adequate margin of safety, and the same is true with respect to the embodiment of Fig. 6, wherein the spring 45 tends to maintain the valve open.

It will be noted that when the valve is open the pressure in the interior of the valve casing acts on both diaphragms 20 and 25 and hence the force on the diaphragm 20 tending to open the valve is balanced by that on the diaphragm 25 which tends to close the valve. Thus, in operation the valve is perfectly balanced so that a very slight pressure on the operating yoke 34 is effective to close the valve.

While I have shown and described certain desirable embodiments of the invention, it is to be understood that this disclosure is for the purpose of illustration and that various changes and modifications may be made without departing from the spirit and scope of the invention as set forth in the appended claims.

I claim:

1. A valve of the class described comprising a casing having inlet and outlet ports, a valve opening between said ports dividing the interior of said casing into two compartments, flat flexible imperforate diaphragms at the opposite ends of said casing providing imperforate seals at said opposite ends, a valve stem movably mounted within said casing and extending through said valve opening with its opposite ends terminating inwardly of and engageable with the inner faces of said diaphragms, a valve head carried by said stem and operable to open and close said valve opening when said stem is moved from one position to another, and a valve-actuating yoke embracing the exterior of said casing and movable relative thereto, said yoke having parts projecting inwardly so as to engage the outer faces of said diaphragms and act on one of the opposite ends of said stem to move said head to and from closed position.

2. A valve of the class described comprising a casing having inlet and outlet ports, a valve opening between said ports dividing the interior of said casing into two compartments, flat flexible imperforate diaphragms at the opposite ends of said casing providing imperforate seals at said opposite ends, a valve stem movably mounted within said casing and extending through said valve opening with its opposite ends terminating inwardly of and engageable with the inner faces of said diaphragms, a valve head carried by said stem and operable to open and close said valve opening when said stem is moved from one position to another, the area of said valve head being different from the effective area of one of said diaphragms so that said valve is held in one position by a difference in pressure in said compartments, and a valve-actuating yoke embracing the exterior of said casing and movable relative thereto, said yoke having parts projecting inwardly so as to engage the outer faces of said diaphragms and act on one of the opposite ends of said stem to move said head to and from closed position.

3. A valve of the class described comprising a casing having inlet and outlet ports, a valve opening between said ports dividing the interior of said casing into two compartments, flat flexible imperforate diaphragms at the opposite ends of said casing providing imperforate seals at said opposite ends, a valve stem movably mounted within said casing and extending through said valve opening with its opposite ends terminating inwardly of and engageable with the inner faces of said diaphragms, a valve head carried by said stem and operable to open and close said valve opening when said stem is moved from one position to another, the effective area of the diaphragm of the compartment communicating with the inlet part being greater than the area of said valve head so that said valve head is opened in response to a greater pressure at the inlet side than that at the outlet side of said valve opening, and a valve-actuating yoke embracing the exterior of said casing and movable relative thereto, said yoke having parts projecting inwardly so as to engage the outer faces of said diaphragms and act on one of the opposite ends of said stem to move said head to and from closed position.

4. A valve of the class described comprising a casing having inlet and outlet ports, a valve opening between said ports dividing the interior of said casing into two compartments, flat flexible imperforate diaphragms at the opposite ends of said casing providing imperforate seals at said opposite ends, a valve stem movably mounted within said casing and extending through said valve opening with its opposite ends terminating inwardly of and engageable with the inner faces of said diaphragms, a valve head carried by said stem and operable to open and close said valve opening when said stem is moved from one position to another, a valve-actuating yoke embracing the exterior of said casing and movable relative thereto, said yoke having parts projecting inwardly so as to engage the outer faces of said diaphragms and act on one of the opposite ends of said stem to move said head to and from closed position, and resilient means acting on said yoke for normally holding said valve head in one of two positions.

5. A valve of the class described comprising a casing having inlet and outlet ports, a valve opening between said ports dividing the interior of said casing into two compartments, flat flexible imperforate diaphragms at the opposite ends of said casing providing imperforate seals at said opposite ends, a valve stem movably mounted within said casing and extending through said valve opening with its opposite ends terminating inwardly of and engageable with the inner faces of said diaphragms, a valve head carried by said stem and operable to open and close said valve opening when said stem is moved from one position to another, a valve-actuating yoke slidably mounted on the exterior of said casing, said yoke having inwardly extending parts engageable with the outer faces of said diaphragms and acting on the opposite ends of said stems to move said valve head to and from open position, and a lever pivotally mounted on the exterior of said casing and connected with said yoke so as to effect operation of said valve.

WILLIAM E. WHITNEY.

References Cited in the file of this patent
UNITED STATES PATENTS

| Number | Name | Date |
|---|---|---|
| 1,502,734 | Martin | July 29, 1924 |
| 1,859,834 | May | May 24, 1932 |
| 1,983,106 | Sundstrom | Dec. 4, 1934 |
| 1,995,395 | Mohr | Mar. 26, 1935 |
| 2,386,873 | Mercier | Oct. 16, 1945 |